E. W. BRAGUE.
BARREL TAP.
APPLICATION FILED JUNE 23, 1911.
1,024,971.                                      Patented Apr. 30, 1912.
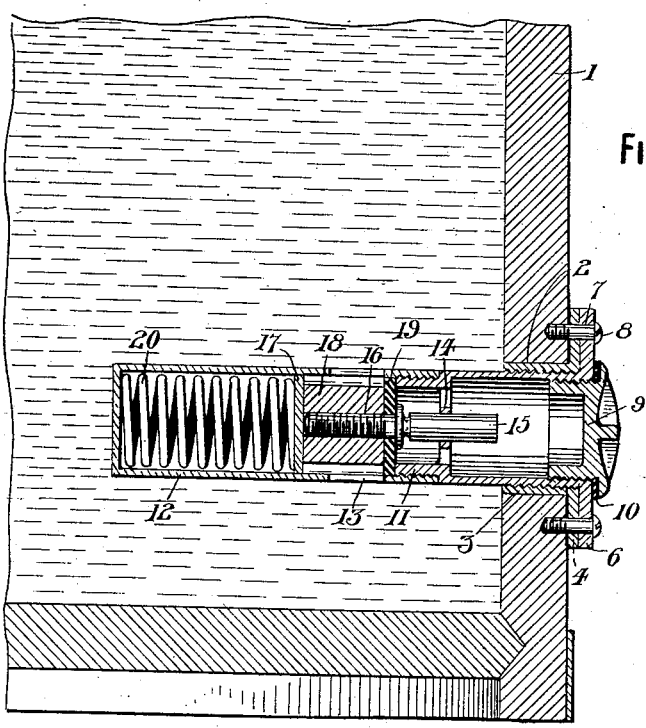
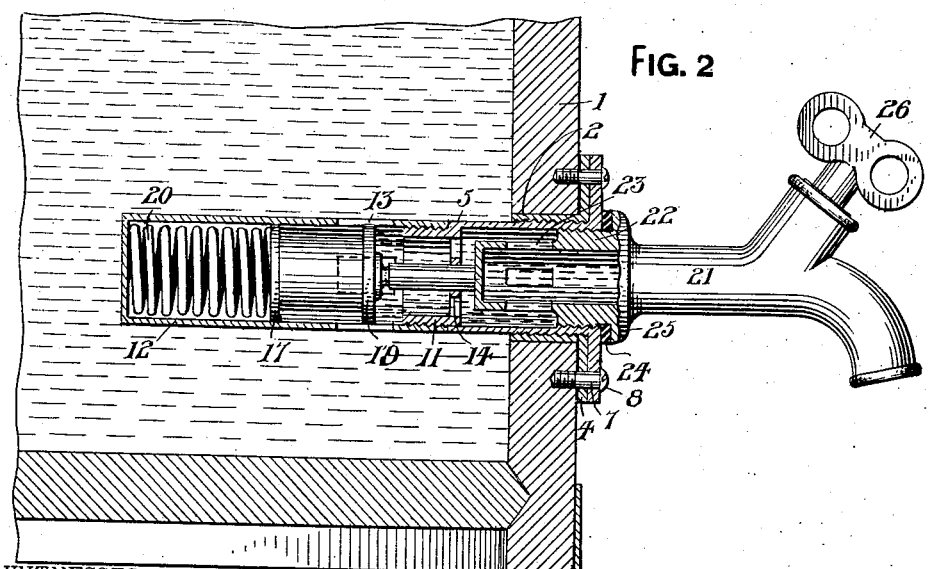

UNITED STATES PATENT OFFICE.

EVERETT WESLEY BRAGUE, OF CLARINGTON, OHIO.

BARREL-TAP.

1,024,971.

Specification of Letters Patent.

Patented Apr. 30, 1912.

Application filed June 23, 1911. Serial No. 634,941.

*To all whom it may concern:*

Be it known that I, EVERETT WESLEY BRAGUE, a citizen of the United States of America, residing at Clarington, in the county of Monroe and State of Ohio, have invented certain new and useful Improvements in Barrel-Taps, of which the following is a specification, reference being had therein to the accompanying drawing.

This invention relates to barrel taps, especially designed for receptacles, and the primary object of my invention is to furnish a receptacle with a normally closed valve adapted to be automatically opened when a spigot or faucet is placed in position for withdrawing the contents of the receptacle.

Another object of this invention is to provide a barrel tap that can be advantageously used in connection with barrels, tanks and other types of receptacles containing liquids adapted to be drawn off from time to time.

A further object of this invention is the provision of positive and reliable means, in a manner as will be hereinafter set forth, for easily and quickly tapping a barrel without resorting to the use of a bung starter or a bung or similar closure.

I attain the above objects by a mechanical construction that is simple, durable, easy to install and inexpensive to manufacture.

The invention will be hereinafter specifically described and then claimed, and reference will now be had to the drawing, wherein:—

Figure 1 is a longitudinal sectional view of the tap, and Fig. 2 is a similar view showing a spigot or faucet in position and the tap open.

The reference numeral 1 denotes the wall of a receptacle having an opening 2, adjacent to the bottom, and mounted in this opening is a bushing 3. The bushing 3 has the outer end thereof provided with a peripheral flange 4, and said bushing is interiorly screw threaded to receive the screw threaded end of a cylindrical valve body 5. The outer end of the valve body has a peripheral flange 6 and this flange and the flange 4 are provided with openings 7 to receive screws 8 employed for securing said flanges to the wall of the receptacle. The outer end of the valve body is also interiorly screw threaded to receive an exteriorly screw threaded plug 9 adapted to close the outer end of the valve body. A gasket 10 made of rubber or other resilient material is interposed between the flange 6 and the peripheral edges of the plug 9 to insure a nonleakable connection.

The valve body 5 has the inner end thereof reduced and exteriorly screw threaded, as at 11 to receive a cylindrical casing 12 having the inner end thereof closed and the end adjacent to said valve body provided with oblong openings or slots 13. The reduced end of the valve body 5 has a spider 14 for a valve stem 15. The valve stem 15 has a threaded portion 16 upon which is mounted a piston, comprising a washer 17, a body 18 of less diameter than the casing 12 and a gasket 19 snugly engaging the inner walls of the casing 12 and adapted to seat against the reduced end of the valve body 5. Interposed between the closed end of the casing 12 and the washer 17 is a coiled compression spring 20 adapted to normally maintain the gasket 19 seated, whereby the contents of the receptacle cannot flow through the valve body 5.

The reference numeral 21 denotes a spigot or faucet having an exteriorly threaded extension 22 whereby, when the plug 9 is removed, said extension can be screwed into the valve body 5. The end of the extension 22 is reduced and provided with openings 23 establishing communication between the valve body 5 and the spigot or faucet 21. A washer or gasket 24 can be interposed between the flange 6 of the valve body and the flange 25 of the spigot or faucet.

As the spigot or faucet is screwed into the valve body, the inner reduced end thereof engages the end of the stem 15 and gradually moves the same inwardly, thereby moving the piston within the casing 12 and placing the compression spring 20 under tension. When the gasket 19 of the piston head is unseated, the contents of the receptacle will flow into the valve body 5, through the spider 14 and the openings 23 of the spigot or faucet. By opening the valve 26 of the spigot or faucet, the contents of the receptacle can be obtained.

When the spigot or faucet is detached, the tension of the spring 20 is sufficient to seat the gasket 19 as the spigot or faucet is unscrewed, and in consequence of this arrangement, a portion of the contents of the receptacle can be obtained and then the spigot or faucet detached and used for the same purpose in connection with another receptacle.

The plug 9 is simply employed to prevent dirt and other foreign matter from entering the valve body, also for preventing the insertion of a stick or other instrument that might be employed for pressing upon the valve stem 15 to open said valve and surreptitiously obtaining the contents of the receptacle.

From the foregoing it will be observed that the piston serves functionally as a valve for controlling the outlet of the contents of the receptacle, and that the valve is actuated by a spigot or faucet that controls the outlet of the contents after having been released by an inward movement of the piston head.

What I claim is:—

1. In a barrel tap, a cylindrical valve body provided with a flanged outer end and an exteriorly screw-threaded reduced open inner end, a cylindrical casing connected with said threaded inner end of the valve body and provided with openings near the connected end thereof and closed at its inner end, a spider mounted in the reduced inner end of the valve body, a stem mounted for longitudinal movement in said spider and provided with a threaded inner end, a piston mounted on the threaded end of said stem and comprising end washers and a body, said end washers being of a diameter to fit the bore of the casing and the body being of less diameter than the bore of said casing, and a spring interposed between the piston and the closed inner end of the casing.

2. In a barrel tap, a cylindrical valve body, exteriorly and interiorly threaded at its outer end, the interiorly threaded outer end of the valve body bore adapted to receive a spigot therein, the exteriorly threaded outer end of the valve body adapted to secure the same within a bung opening, said valve body having an exteriorly threaded open inner end, a casing connected to said reduced inner end of the valve body and provided with openings near its connected end and closed at its inner end, a spider in the reduced inner end of the valve body, a stem mounted to move longitudinally in said spider, a piston mounted on the inner end of said stem and comprising two end members, and a piston body, the end members being of a diameter to fit the bore of the casing, and the piston body being of less diameter than the casing, and a spring interposed between the closed inner end of the casing and the piston.

In testimony whereof I affix my signature in the presence of two witnesses.

EVERETT WESLEY BRAGUE.

Witnesses:
   MAX H. SROLOVITZ,
   JOHN E. MORRILL.

---

Copies of this patent may be obtained for five cents each, by addressing the "Commissioner of Patents, Washington, D. C."